US009610860B2

(12) United States Patent
Lázaro Goicoechea

(10) Patent No.: US 9,610,860 B2
(45) Date of Patent: Apr. 4, 2017

(54) COUNTERWEIGHT FOR TENSIONING THE WIRE OF A CATENARY IN A RAILWAY LINE

(71) Applicant: SIC LÁZARO, S.L., Corella (ES)

(72) Inventor: Javier Ignacio Lázaro Goicoechea, Corella (ES)

(73) Assignee: SIC LAZARO, S.L., Corella (ES)

( * ) Notice: Subject to any disclaimer, the term of this patent is extended or adjusted under 35 U.S.C. 154(b) by 0 days.

(21) Appl. No.: 14/736,304

(22) Filed: Jun. 11, 2015

(65) Prior Publication Data

US 2015/0360585 A1    Dec. 17, 2015

(30) Foreign Application Priority Data

Jun. 12, 2014 (ES) .................................. 201430897

(51) Int. Cl.
*A47H 33/00* (2006.01)
*B60M 1/20* (2006.01)
*B60M 1/26* (2006.01)

(52) U.S. Cl.
CPC ................ *B60M 1/20* (2013.01); *B60M 1/26* (2013.01)

(58) Field of Classification Search
CPC .................................. B60M 1/20; B60M 1/26
USPC .............. 248/364; 174/40 R, 40 TD, 45 TD; 242/388.1
See application file for complete search history.

(56) References Cited

U.S. PATENT DOCUMENTS

| 3,740,782 | A | * | 6/1973 | Newman | ................. | E01D 15/02 |
| | | | | | | 14/42 |
| 4,171,176 | A | * | 10/1979 | Yamada | ................. | E04C 5/163 |
| | | | | | | 405/239 |
| 5,558,147 | A | * | 9/1996 | Nofziger | ............... | E05D 13/145 |
| | | | | | | 16/194 |
| 8,492,649 | B2 | * | 7/2013 | Sasa | ......................... | B60M 1/26 |
| | | | | | | 174/40 R |
| 2008/0083298 | A1 | | 4/2008 | Lin | | |

FOREIGN PATENT DOCUMENTS

| DE | 1 925 539 | 4/1965 |
| EP | 0 745 504 B1 | 10/1998 |
| EP | 2 183 673 | 3/2003 |
| EP | 2 426 078 A2 | 3/2012 |
| EP | 2 377 892 | 4/2012 |

OTHER PUBLICATIONS

Spanish Search Report issued Aug. 7, 2015, in Spanish Application No. 201430897.

* cited by examiner

*Primary Examiner* — Gwendolyn Baxter
(74) *Attorney, Agent, or Firm* — Wenderoth, Lind & Ponack, L.L.P.

(57) ABSTRACT

A counterweight is provided for tensioning the wire of a catenary in a railway line, comprising a metal shell (1) made up of a frame (1*a*) and a surrounding body (1*b*) which is filled with a filler material (2), which integrates at least high-density concrete in combination with a metal material as an additional filler for increasing the density of the counterweight. The frame (1*a*) is embedded into the filler material (2) and in turn, is linked to the surrounding body (1*b*) by a welded joint.

14 Claims, 3 Drawing Sheets

CUT LINE A-B

CUT LINE A-B

COUNTERWEIGHT FOR TENSIONING THE WIRE OF A CATENARY IN A RAILWAY LINE

OBJECT OF THE INVENTION

The present invention, as expressed in the title of the present specification, relates to a counterweight for tensioning the wire of a catenary: hanging and contact wire in a railway line, which aims to reduce manufacturing costs and increase the useful life thereof, such that the counterweight of the invention considerably reduces the amount of metal—mainly steel—used, thus preventing thefts such as those currently taking place with counterweights made of metal.

It is essentially designed to be installed in high speed railway lines.

BACKGROUND OF THE INVENTION

The counterweights currently used for tensioning the wires of a catenary of a train were traditionally produced as an assembly of smelting pieces, mounted to a rod that tensions the wires forming the catenary.

The need to reduce costs, the rising price of iron and steel and the problem of the same being stolen in some countries make necessary a change in the traditional way of manufacturing these counterweights.

The option currently employed in order to face up to these limitations consists of using counterweights made from mixtures including concrete, which are well known in other sectors.

The main disadvantage of this consists in guaranteeing the durability required of these elements, given that they are exposed to the elements for long periods of time.

It must also be added that, although there don't seem to be any spatial restrictions, practical conditions do come into play as regards the size and shape of said counterweights, particularly of those designed for high speed railway lines, where the circulation of the train may come to exert considerable aerodynamic loads on the counterweights.

DESCRIPTION OF THE INVENTION

With the aim of achieving the objectives and preventing the limitations set out above, the invention proposes a counterweight for tensioning the wire of the catenary in a railway line, which in principle, has an external pull with to hook at least one end of the catenary wire.

It comprises a metal shell made up of a frame and a surrounding body, which is filled with a filler material integrating at least high density concrete combined with a metal material as additional filler, for increasing the density of the counterweight. The surrounding body is galvanized.

The shell is embedded into the filler material and in turn, is joined to the surrounding body by means of a welded join.

Said shell comprises at least a main bar that runs along the entire length of the counterweight and a number of crossbars, which cross the main bar, where the ends of the crossbars are joined by means of welding to the surrounding body and where the crossbars are also joined by means of welding to the main bar.

An upper end stretch of the main bar of the shell protrudes out of the counterweight, the external pull forming the means for hooking the counterweight assembly being joined to said upper end stretch by means of welding.

The counterweight includes a through hole through which a tension rod that limits the rolling movement of the counterweight goes through, where the through hole is integrated in an outer ring.

In one embodiment, it is an outer ring that forms part of a metal plate embedded into the filler material, which crosses the surrounding body.

In another embodiment, the outer ring is welded to the outer face of the surrounding body.

The metal plate is joined to both the surrounding body and the main bar of the frame by means of welding, where the main bar crosses the metal plate. Both the frame and the surrounding body are made of a steel metal material, as is the case of the metal plate.

The filler material comprises high density concrete, mill scale, steelwork waste with a high iron content and a binding agent such as cement, in addition to additives bound to the concrete material.

In one embodiment, the filler material includes a structural fibre in its formulation.

The counterweight comprises a hollow cylindrical structure, which constitutes the surrounding body, defined by a side wall and an upper base, from the centre of which the upper end stretch of the main bar of the frame housed inside the surrounding body protrudes outwards, the filler material also being housed inside the same.

In an alternative embodiment, the counterweight comprises the elements mentioned in the paragraph above, in addition to a lower base.

Below, in order to facilitate a better understanding of the present specification, a series of drawings have been attached, which provide a non-limiting illustration of the object of the invention, forming an intrinsic part of the same.

DESCRIPTION OF AN EXEMPLARY EMBODIMENT OF THE INVENTION

Figure 1:
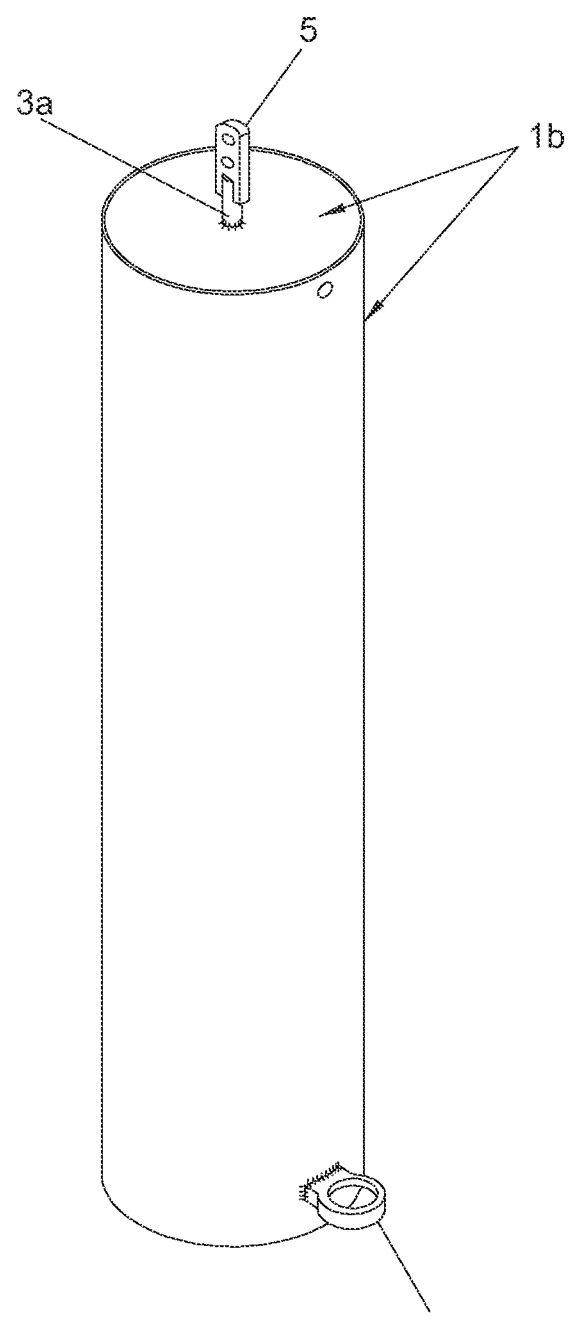
FIG. 1.—Is a perspective view of the counterweight for tensioning the wire of a catenary in a railway line object of the invention.
Figures 2, 3:
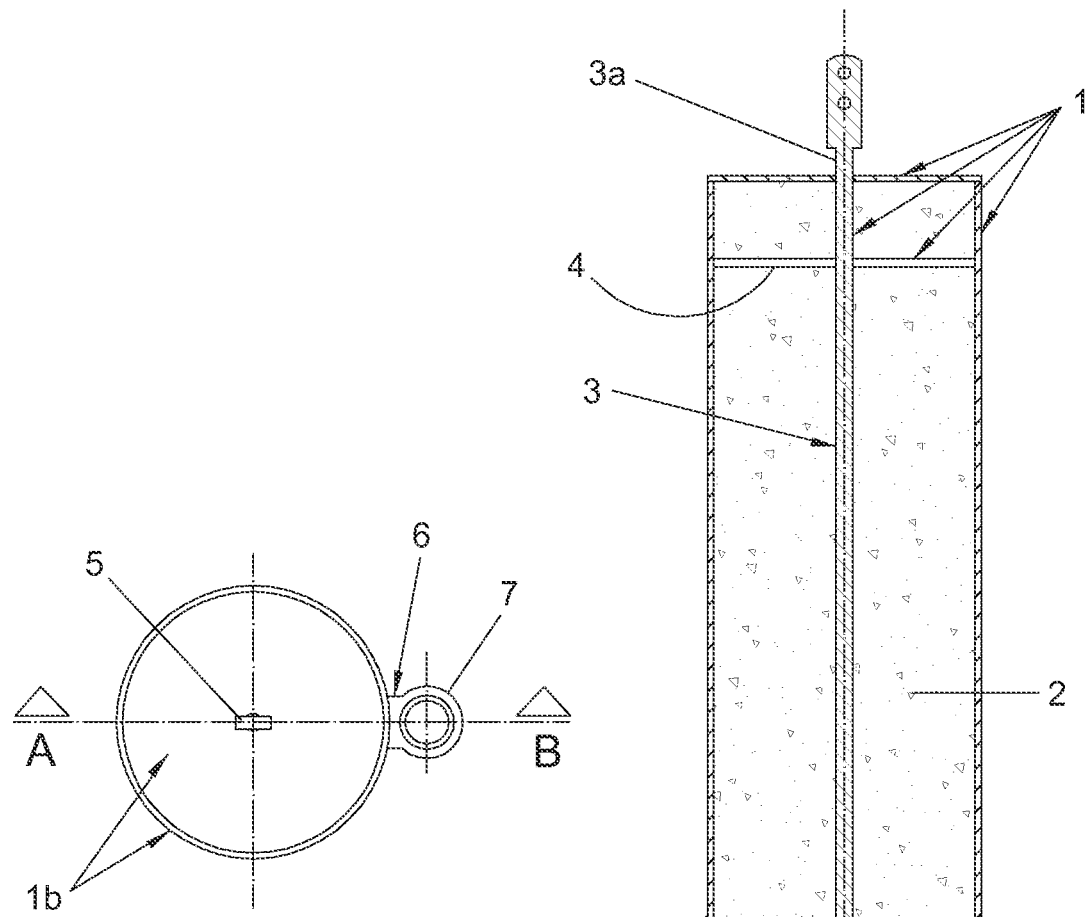
FIG. 2.—Is a plan view of the counterweight of the invention.
FIG. 3.—Is a cross-section, according to cut line A-B in the previous Figure.
Figure 4:
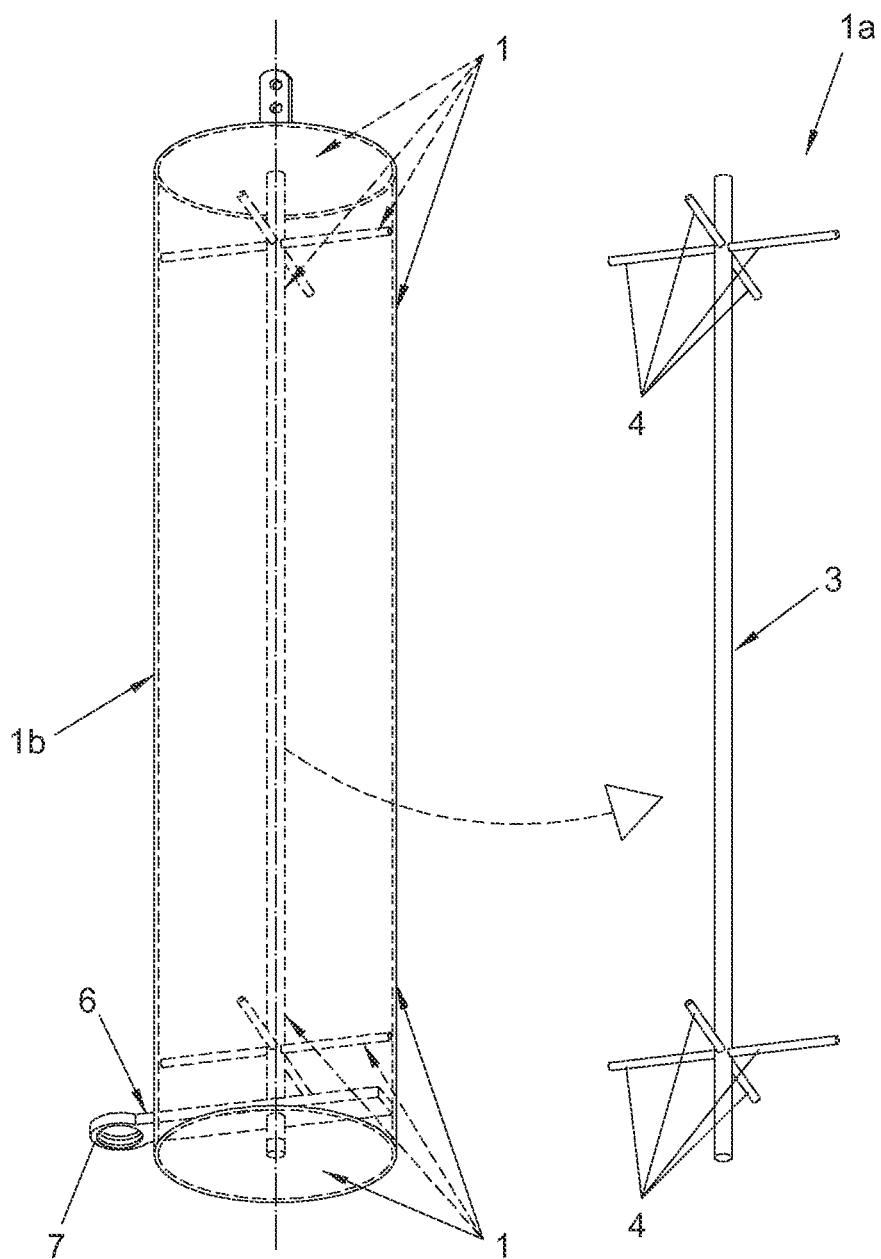
FIG. 4.—Is another perspective view of the counterweight of the invention.

Taking the numbering adopted in the Figures into account, the counterweight for tensioning the wire of a catenary in a railway line comprises the following elements as included in the description:

1.—Metal shell
1a.—Frame
1b.—Surrounding body
2.—Filler material
3.—Main bar
3a.—Upper end stretch
4.—Crosspieces
5.—Pull
6.—Metal plate
7.—Outer ring The object of the invention is a counterweight for tensioning the wire of a catenary in a railway line, comprising a metal shell (1) made of steel, which is made up of a frame (1a) and a surrounding body (1b), which is filled with a filler material (2) made up of a high density concrete material combined with a metal material as an additional filler for increasing the density of the counterweight when required.

The metal shell (1) comprises the frame (1a) and the surrounding body (1b), inside which the concrete material and the metal material are housed, when the same is incorporated, the frame (1a) and the surrounding body (1b) being made of a steel material.

The frame (1a) is embedded into the filler material (2), whilst also being joined by means of welding to the surrounding body (1b). As such, the frame (1a) comprises at least a main bar (3), which runs along the entire length of the counterweight and a number of crosspieces (4) that cross the main bar (3), the ends of these crosspieces (4) being joined to the surrounding body (1b). The crosspieces are located in an upper portion and in a lower portion.

Moreover, an upper end stretch (3a) of the main bar (3) protrudes out of the counterweight, an outer pull (5) being joined to said upper end stretch (3a) by means of welding, by way of a hooking means for hooking the counterweight assembly to the catenary wire.

The outer pull (5) made of steel is welded to the main bar (3) of the frame (1a), the crosspieces (4) of which are welded to the surrounding body (1b) made of steel and also to the main bar (3).

Furthermore, the counterweight includes a metal plate (6) in a lower stretch of the same, which is also embedded into the filler material (2) and which is welded to both the main bar (3) of the frame (1a) and to the surrounding body (1b) in two opposing areas. The metal plate (6) protrudes outwards crossing through the wall of the surrounding body (1b), in such a way that the protruding part comprises an outer ring (7) with a through hole through which a tension rod that limits the rolling movement of the counterweight passes.

In an alternative embodiment to that one described in the previous paragraph, the metal plate is removed and the outer ring (7) is therefore welded directly to the outer face of the surrounding body (1b).

The surrounding steel body (1b) is galvanized in order to protect it from environmental conditions and corrosion (sunlight, rain, etc), and to increase the useful life of this part.

A plastic surrounding body is not deemed appropriate, since extreme environmental conditions would reduce the useful life of the plastic surrounding body considerably.

The filler material (2) is basically made of high density concrete, mill scale, steelworks waste with a high iron content and a binding agent such as cement, in addition to additives known about in the concrete industry.

In addition, in order to make the inner filler material (2) more durable and complete, in the event of the steel surrounding body (1b) not including a lower base as a lid, a structural fibre is added to the formulation thereof.

The additional ferrous material for increasing the density of the counterweight may be made up of different kinds of scrap metals or similar.

With the aim of avoiding the aerodynamic load exerted when the train passes, the counterweight is rounded in shape, thereby reducing the action of the same, in such a way that the surrounding body (1b) comprises a hollow cylindrical structure, defined by a side wall, a lower base and an upper base, at the centre of which the upper end stretch (3a) of the main bar (3) of the frame (1a) housed inside the surrounding body (1b) protrudes outwards, the filler material (2) also being housed in the same.

The counterweight will be produced as follows: the surrounding body (1b) with its internal elements welded, is covered at its upper end. It is arranged in an inverted position and filled with high density concrete and scrap metal (if necessary). This mixture is compacted and once said mixture has hardened, the lower base, if the same is required, is welded.

The invention claimed is:

1. Counterweight for tensioning a wire of a catenary in a railway line, which has an outer pull to be hooked to at least one end of the catenary wire, where:
   the counterweight comprises a metal shell (1) made up of a frame (1a) and a surrounding body (1b), which is filled with a filler material (2) that integrates at least high density concrete combined with a metal material as an additional filler for increasing the density of the counterweight;
   the frame (1a) being embedded into the filler material (2) while also being joined to the surrounding body (1b) via a welded join;
   characterized in that the frame (1a) comprises at least a main bar (3), which runs along the entire length of the counterweight, in addition to a number of crosspieces (4), which cross the main bar (3); where the ends of the crosspieces (4) are joined by welding to the surrounding body (1b) and where the crosspieces (4) are joined by welding to the main bar (3).

2. Counterweight for tensioning the wire of the catenary in the railway line according to claim 1,
   characterized in that an upper end stretch (3a) of a main bar (3) of the frame (1a) protrudes out of the counterweight, the outer pull (5) constituting hooking means for hooking the counterweight, the hooking means being joined to said upper end stretch (3a) by welding.

3. Counterweight for tensioning the wire of the catenary in the railway line according to claim 1,
   characterized in that the counterweight comprises a through hole, through which a tension rod that limits rolling movement of the counterweight passes.

4. Counterweight for tensioning the wire of the catenary in the railway line according to claim 3, characterized in that the through hole through which the tension rod passes is integrated into an outer ring (7), which forms part of a metal plate (6) embedded into the filler material (2) and which crosses the surrounding body (1b).

5. Counterweight for tensioning the wire of the catenary in the railway line according to claim 4, characterized in that the metal plate (6) is joined by welding to both the surrounding body (1b) and the main bar (3) of the frame (1a), where the main bar (3) crosses the metal plate (6).

6. Counterweight for tensioning the wire of the catenary in the railway line according to previous claim 4, characterized in that the metal plate (6) is made of a steel material.

7. Counterweight for tensioning the wire of the catenary in the railway line according to claim 3, characterized in that the through hole through which the tension rod passes is integrated into an outer ring (7), which is welded to the outer face of the surrounding body (1b).

8. Counterweight for tensioning the wire of the catenary in the railway line according to claim 1, characterized in that both the frame (1a) and the surrounding body (1b) are made of a steel metal material.

9. Counterweight for tensioning the wire of the catenary in the railway line according to claim 8, characterized in that the filler material (2) includes a structural fiber in its formulation.

10. Counterweight for tensioning the wire of the catenary in the railway line according to claim 1,
characterized in that the filler material (2) comprises high density concrete, mill scale, steelworks waste with a high iron content and a binding agent, in addition to additives bound to the concrete material.

11. Counterweight for tensioning the wire of the catenary in the railway line according to claim 10, wherein the binding agent comprises cement.

12. Counterweight for tensioning the wire of the catenary in the railway line according to claim 1, characterized in that the surrounding body (1b) is galvanized.

13. Counterweight for tensioning the wire of the catenary in the railway line according to claim 1, characterized in that the counterweight comprises a hollow cylindrical structure constituting the surrounding body (1b) defined by a side wall, a lower base and an upper base, with both the frame (1a) and the filler material (2) being housed inside the surrounding body (1b).

14. Counterweight for tensioning the wire of the catenary in the railway line according to claim 1,
characterized in that the counterweight comprises a hollow cylindrical structure constituting the surrounding body (1b), defined by a side wall and an upper base, with both the frame (1a) and the filler material (2) being housed within the surrounding body (1b).

\* \* \* \* \*